United States Patent [19]

Dosaka

[11] Patent Number: 5,228,357
[45] Date of Patent: Jul. 20, 1993

[54] STAGE DRIVING DEVICE FOR OPTICAL EXAMINING APPARATUS

[75] Inventor: Shinichi Dosaka, Tsukui, Japan

[73] Assignee: Olympus Optical Co., Ltd., Tokyo, Japan

[21] Appl. No.: 703,781

[22] Filed: May 21, 1991

[30] Foreign Application Priority Data

May 28, 1990 [JP] Japan ................................ 2-137944

[51] Int. Cl.⁵ ............................................ G05G 11/00
[52] U.S. Cl. ............................ 74/479 MM; 108/143
[58] Field of Search ..................... 74/206, 209, 479; 108/143; 359/393; 248/661

[56] References Cited

U.S. PATENT DOCUMENTS

| 4,552,033 | 11/1985 | Märzhäuser | 74/479 |
| 4,573,771 | 3/1986 | Hill | 74/479 X |
| 4,615,592 | 10/1986 | Schob et al. | 74/479 X |
| 4,660,942 | 4/1987 | Hill | 74/479 X |
| 4,700,585 | 10/1987 | Märzhäuser | 74/479 |

FOREIGN PATENT DOCUMENTS

| 56-19050 | 5/1981 | Japan . |
| 57-45513 | 3/1982 | Japan . |
| 57-99607 | 6/1982 | Japan . |
| 61-198206 | 9/1986 | Japan . |
| 61-246714 | 11/1986 | Japan . |
| 1-153509 | 10/1989 | Japan . |

Primary Examiner—Allan D. Herrmann
Assistant Examiner—David W. Laub
Attorney, Agent, or Firm—Cushman, Darby & Cushman

[57] ABSTRACT

A stage driving device for optical examining apparatus has a pair of moving beds capable of traveling in directions perpendicular to each other, straight guide members mounted on the moving beds, driving knobs coaxially arranged to move the moving beds, and a transmission mechanism converting a rotary motion of each of the driving knobs into a rectilinear motion of each of the moving beds. By the operation of the transmission mechanism, the movements of the moving beds can be made in two directions perpendicular to each other, independently or simultaneously. Additionally, the wear of parts of the straight guide members and the transmission mechanism is minimal and the use of inexpensive parts and the ease of assembly makes it possible to reduce the cost of the entire device.

5 Claims, 4 Drawing Sheets

STAGE DRIVING DEVICE FOR OPTICAL EXAMINING APPARATUS

BACKGROUND OF THE INVENTION a) Field of the Invention

This invention relates to a driving device capable of being preferably utilized for moving a stage for optical examining apparatus, such as microscopes, having a pair of moving beds capable of traveling in directions normal to each other, straight guide members, one member being mounted on one side of each of the moving beds, driving knobs extending in a direction normal to planes along which the moving beds travel, coaxially arranged to render the moving beds travel, and a transmission mechanism arranged between the driving knobs and the straight guide members, converting a rotary motion of each of the driving knobs into a rectilinear motion through each of the straight guide members of the moving beds.

b) Description of the Prior Art

From the fact that the stage driving device of this type is suitable for use in microscopes for examining large-sized wafers in a semiconductor fabrication process, those of many types have been proposed in the past. Each such device is designed so that when the stage is coarsely moved, its movement is easy, while when finely moved by means of the driving knob, it is braked and is not moved without cause even though external force is applied to the stage.

These conventional devices are broadly classified according to their structural features into two ways: a brake system constructed, for instance, as proposed by Japanese Utility Model Publication No. Sho 56-19050 and Japanese Patent Preliminary Publication No. Sho 61-246714, so that rotary wheels concentrically integral with driving knobs whose amounts of turning effects are rendered very small are always engaged with straight guide members of moving beds and the movement of a stage in an ordinary state is smoothly conducted. While in the operation for fine adjustment, frictional members cause pressed force to be applied to the stage or a driving knob shaft for braking, and a clutch system constructed, for example, as proposed by Japanese Patent Preliminary Publication Nos. Sho 57-45513, Sho 57-99607 and Sho 61-198206, and Japanese Utility Model Preliminary Publication No. Hei 1-153509, so that the entire driving knob shaft can directly be disengaged from the straight guide members of the moving beds by cams or the like (which is hereinafter referred to as a direct type) and so that an intermediate transmission wheel is disposed between a driving shaft meshing always with the straight guide members of the moving beds and the driving knob shaft and is pressed against the driving shaft and the driving knob shaft at once in the operation for fine adjustment (which is hereinafter referred to as an indirect type).

Of the above conventional stage driving devices, the brake system has the problem that continuous engagement of rotary wheels integral with the driving knob shaft with the straight guide members of the moving beds, renders it inevitable to bring about the deterioration of performance attributable to wear. The difficulty about the assembly requires accuracy such that the straight guide members must be arranged parallel to the traveling directions of the moving bed. The increase of production costs caused by the use of expensive bearings for smooth rotation of the driving knob shaft is also a problem. In the direct type clutch system, when the elements of the driving knob shaft are engaged with the straight guide members, the concentricity of these elements renders it difficult to position the elements of the driving knob shaft corresponding to individual straight guide members and, as a result, the driving knob shaft is often strongly pressed only against one of the straight guide members. Therefore, the difficulties are encountered that one of the straight guide members is considerably worn and the difference of the amount of driving force arises between the moving beds arranged in a pair. Further, the indirect type clutch system has a problem similar to the brake system because the straight guide members engage always with the driving shaft. This system has another problem similar to the direct type clutch system in view of the operation such that the intermediate transmission wheel is pressed against the driving shaft and the driving knob shaft at once. Also, in order to solve the problems caused by the direct type clutch system, the proposal has been made in the past that resilient member wheels, for example, made of rubber, are secured to the driving knob shaft so as to be engaged with and disengaged from the straight guide members. This method, however, raises a problem that when the moving beds are once fed in positioning the stage and the driving knobs are released, the moving beds are moved by the resilience of the resilient member wheels and the stage is shifted from a desired position. Additionally, there is another problem that the use of such wheels in the semiconductor fabrication process will form the source of dust in a clean room. Also, in order to solve the problems caused by the resilient member wheels made of rubber or the like and caused when the elements of the driving knob shaft are pressed against the straight guide members at once, the device constructed to make no use of the resilient member wheels has been proposed by the above Sho 61-198206. However, it has the problem that the structure is extremely complicated with the resultant high cost.

SUMMARY OF THE INVENTION

It is, therefore, the object of the present invention to provide a stage driving device of the type which is free from the wear of engaged parts, makes no difference of the amount of driving force between the moving beds, and can be manufactured with a simple structure and at low cost.

This object is accomplished, according to the present invention, by providing a transmission mechanism comprised of rotary gears integral with driving knobs for fine adjustment and levers turnably mounted to be concentric with the driving knobs, supporting concentrically and integrally intermediate transmission gears meshing with the rotary gears and driving wheels capable of being disengaged from straight guide members of the moving beds.

According to a preferred embodiment of the present invention, each of the driving knobs or each of the intermediate transmission gears is equipped with a brake means, and each of the straight guide members has a circular or triangular cross section and is attached to each of the moving beds at two places of the ends only.

In general, provided that each of the straight guide members is fixed at two places of the ends, functional problems will not arise offered. In a case where the stroke of the moving bed exceeds 300 mm, the guide member may be fixed at three or four places. For three or more points where the guide member is fixed, however, it is required that adjustment is previously made so that these points are the same in height.

According to the present invention, in the transmission mechanism, the levers are constructed to be capable of taking a position where the driving wheels are engaged with the straight guide members and another position where they are disengaged from the guide members, so that when the driving wheels abut on the guide members, the turn of the driving knobs enables the moving beds to travel in predetermined directions. The stage is thus shifted to a desired position.

In such a case, if each of the driving knobs or each of the intermediate transmission gears is equipped with a brake means, each of the moving beds will not be affected by inertia force in the fine adjustment or moved without cause even though external force is applied to the stage. Further, if each of the straight guide members is fixed at its ends only, it can be deflected, with the result that even though yawing and pitching of the moving beds occurs when the moving beds travel, the engagement of the driving wheels with the straight guide members can always be maintained in a normal state.

This and other objects as well as the features and the advantages of the present invention will become apparent from the following detailed description of the preferred embodiment when taken in conjunction with the accompanying drawings.

DESCRIPTION OF THE PREFERRED EMBODIMENT

Figure 1:
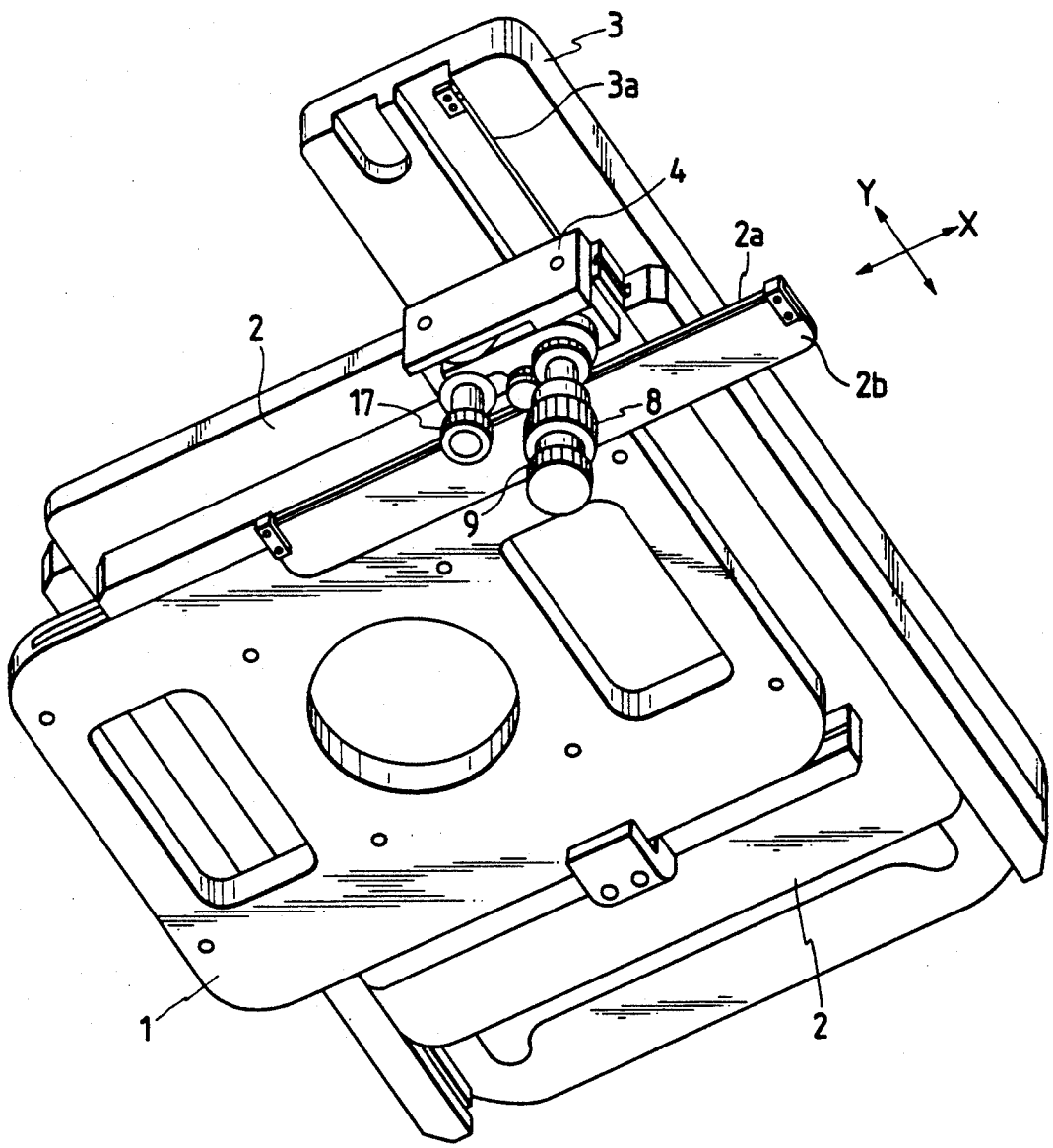
FIG. 1 is a perspective view showing the appearance of the stage making use of the driving device of the present invention.

In accordance with the embodiment shown in the drawings, the present invention will be described in detail below.

In FIG. 1, first of all, reference numeral 1 denotes a fixed plate to be attached to the focusing section of a microscope body by means of screws and the like, 2 a first moving bed attached to the fixed plate 1 to be able to travel linearly in a first direction (for example, in a direction X) and a bar-shaped straight guide member 2a of a circular cross section which is held by a supporting member 2b, mounted on its one side, extending in the first direction, 3 a second moving bed attached to the first moving bed 2 to be able to travel linearly in a second direction (for example, in a direction Y) and a bar-shaped straight guide member 3a of a circular cross section, mounted on its one side, extending in the second direction, and 4 a transmission mechanism unit attached to the first moving bed 2 and including driving knobs and a changeover knob which will be described below.

Figure 2:
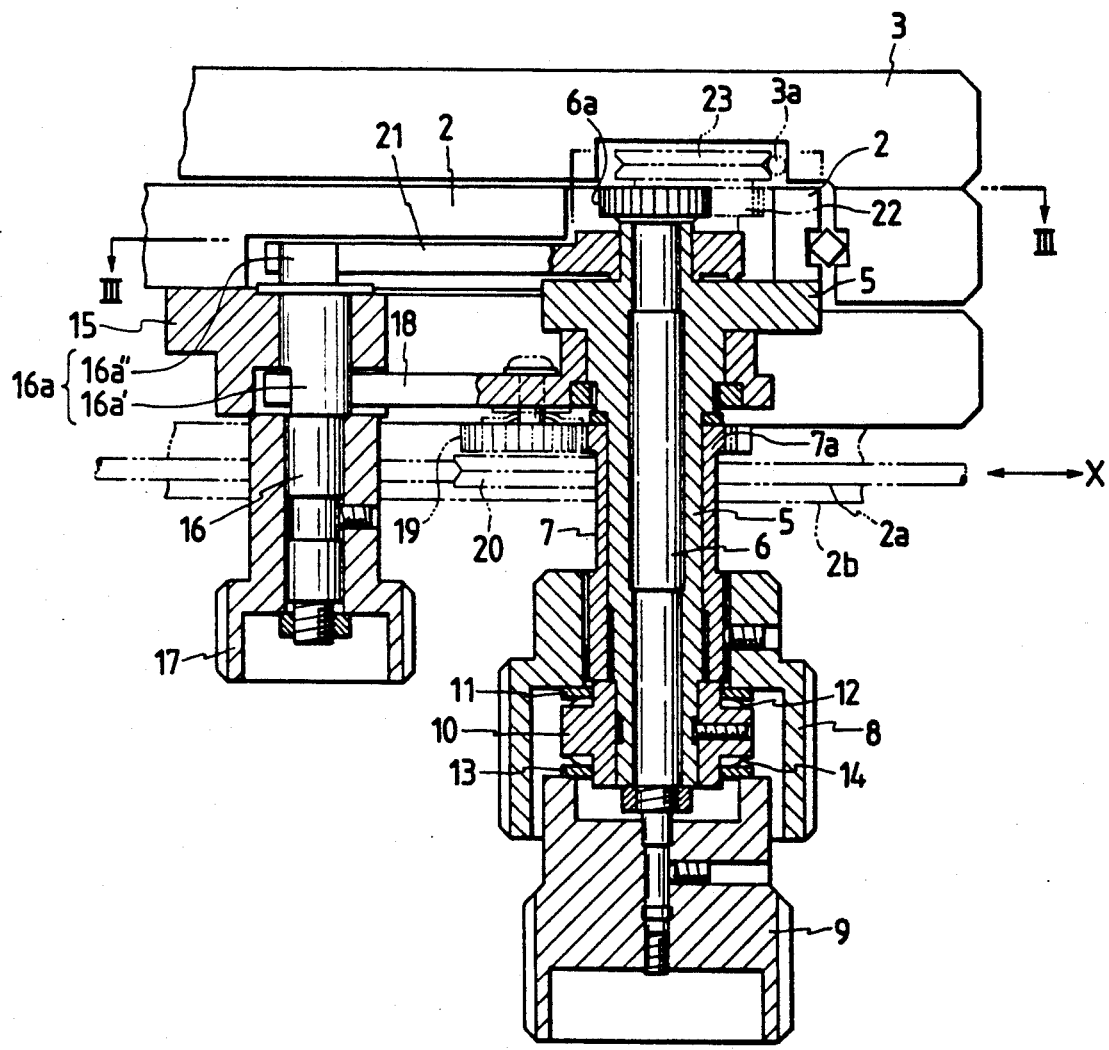
FIG. 2 is a sectional view showing an essential portion of the driving device according to the present invention.
Figure 3:
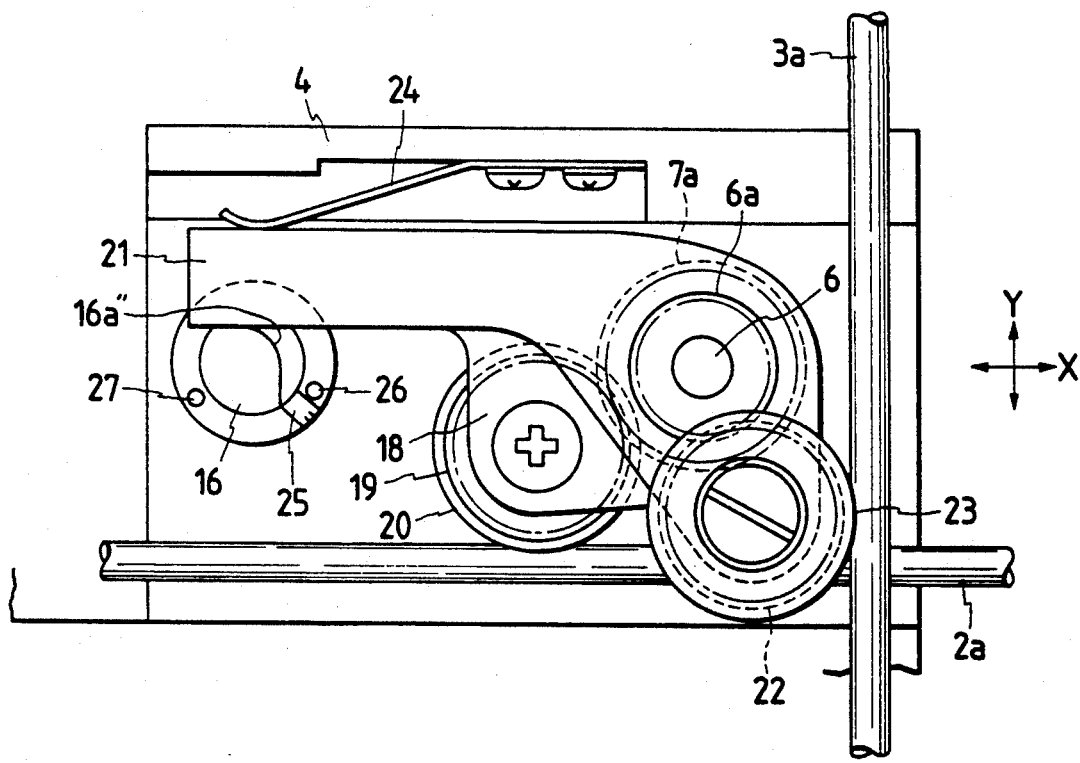
FIG. 3 is a plan view taken along line III—III in FIG. 2.

FIGS. 2 and 3 show the internal structure of the transmission mechanism unit 4. In these figures, reference numeral 5 represents a bearing sleeve integrally attached to the first moving bed 2, 6 a spindle rotatably inserted in the bearing sleeve 5 and having a rotary gear 6a at its tip, 7 a hollow shaft rotatably fitted outside the bearing sleeve 5 and having a rotary gear 7a at its tip, 8 a first driving knob secured to the hollow shaft 7, 9 a second driving knob secured to the lower portion of the spindle 6, 10 a supporting ring secured to the bearing sleeve 5 and supporting the hollow shaft 7 in a space formed inside the first driving knob 8, 11 a washer fitted outside the supporting ring 10 and capable of abutting on the first driving knob 8, 12 a coned disc spring interposed between the shoulder of the supporting ring 10 and the washer 11, 13 a washer fitted outside the supporting ring 10 and capable of abutting on the second driving knob 9, and 14 a coned disc spring interposed between the shoulder of the supporting ring 10 and the washer 13, in which the supporting ring 10, the washer 11 and the coned disc spring 12 constitute a brake means for the first driving knob 8, and the supporting ring 10, the washer 13 and the coned disc spring 14 for the second driving knob 9. Reference numeral 15 represents a bearing attached to a member integral with the first moving bed 2, 16 a changeover shaft rotatably held by the bearing 15 and having a cam 16a (FIG. 3) configured by cutting off a part of the periphery, 17 a changeover knob secured to the changeover shaft 16, 18 a first lever turnably attached to the bearing sleeve 5 so that its free end can abut on the cam 16a of the changeover shaft 16, 19 an intermediate transmission gear pivotally mounted on the first lever 18 and meshing with the rotary gear 7a, 20 a driving wheel attached concentrically and integrally to the intermediate transmission gear 19 so that its V-shaped periphery can be frictionally engaged with the straight guide member 2a, 21 a second lever turnably attached to the bearing sleeve 5 so that its free end can abut on the cam 16a of the changeover shaft 16, 22 an intermediate transmission gear pivotally mounted on the second lever 21 and meshing with the rotary gear 6a, 23 a driving wheel attached concentrically and integrally to the intermediate transmission gear 22 so that its V-shaped periphery can be frictionally engaged with the straight guide member 3a, 24 (FIG. 3) a plate spring whose base is secured to a member integral with the first moving bed 2, pressing the first and second levers 18 and 21 in a counterclockwise direction at the position shown in FIG. 3, that is, in a direction in which the driving wheels 20 and 23 are pressed against the straight guide members 2a and 3a, respectively, and 25 (FIG. 3) a pin secured to the changeover shaft 16 and capable of abutting on a pair of stopper pins 26 and 27 planted in a stationary portion.

The stage driving device according to the present invention is constructed as stated above, and then its function will be explained. FIG. 3 shows the situation that the driving wheels 20 and 23 are engaged with the straight guide members 2a and 3a, respectively, namely, the first and second moving beds 2 and 3 can be operated for fine adjustment. Under this situation, if, for example, the first driving knob 8 is rotated, this rotation will be transmitted to the rotary gear 7a through the hollow shaft 7 and further to the intermediate transmission gear 19 and the driving wheel 20. In such an instance, since the driving wheel 20 is pressed against the straight guide member 2a in virtue of the plate spring 24 so that frictional force acts between the driving wheel 20 and the guide member 2a, it follows that the rotation of the driving wheel 20 allows the first moving bed 2 to travel linearly in the first direction (X). The first driving knob 8 is already braked by the brake means and consequently the first moving bed 2 can be accurately stopped at a preset position as intended, without any inertia motion. Similarly, when the second driving knob 9 is rotated, the second moving bed 3 can be linearly moved in the second direction (Y), through the spindle 6, the rotary gear 6a, the intermediate transmission gear 22, the driving wheel 23, and the straight guide member 3a.

Next, in the state shown, if the changeover knob 17 is rotated until the pin 25 abuts on the stopper pin 27, the first and second levers 18 and 21 will be turned clockwise at once, from the positions in FIG. 3, by virtue of the periphery of the changeover shaft 16 and, as a result, the driving wheels 20 and 23 will be disengaged from the guide members 2a and 3a, respectively. Thus, the operating condition for fine adjustment is released and the first and second moving beds 2 and 3 can be manually operated for coarse adjustment.

Figure 4:
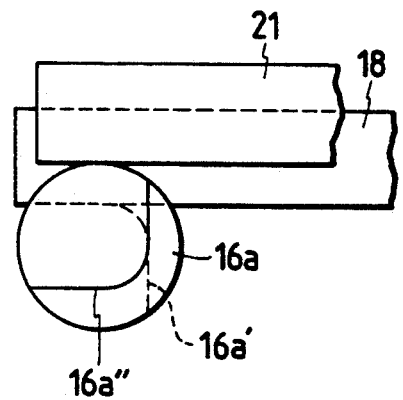
FIG. 4 is an explanatory view showing an example of a changeover cam, different from FIG. 3.
Figure 5A:
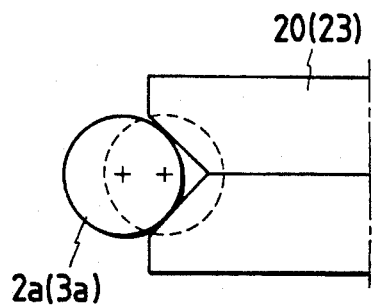
FIGS. 5A and 5B are views for explaining the states of yawing and pitching of a moving bed, respectively.
Figure 6:
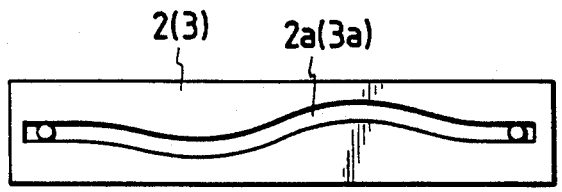
FIG. 6 is a view for explaining the states of the mounting of a straight guide member and its deformation.
Figure 5B:
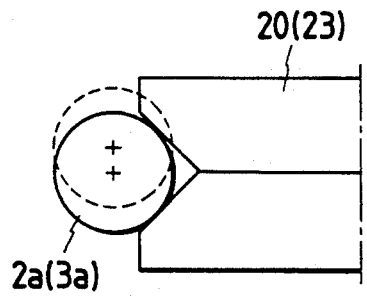

As will be apparent from the foregoing, if the pin 25 and the stopper pins 26 and 27 are eliminated and instead, the cam to be configured on the changeover shaft 16, as shown in FIG. 4, is designed so that a cam 16a' used for the first lever 18 only and a cam 16a" for the second lever 21 only are configured at angular positions spaced 180° from each other and so that the cam 16a common with the first and second levers 18 and 21 already mentioned, is configured at an angular position interposed therebetween, it is possible to change the operation of the first and second moving beds 2 and 3 into coarse or fine adjustment independently or simultaneously, according to the rotational position of the changeover knob 17. For the changeover position in this case, it is necessary only to make regulation by using a click device or the like. In general, the moving beds do not always make an accurate parallel movement due to the difficulties of machining and fabrication, but travel while bringing about yawing and pitching. Hence, provided that the positions of the driving wheels 20 and 23 are constant, the states of contacts of the driving wheels 20 and 23 with the guide members 2a and 3a, respectively, are as shown in FIG. 5A for the yawing and in FIG. 5B for the pitching. It follows from this that the frictional force acting between each driving wheel and each guide member varies and a smooth movement of each moving bed is adversely affected. According to the driving device of the present invention, in contrast to this, since the first and second levers 18 and 21 are pressed by the plate spring 24, the difficulty of the yawing can be obviated, or since each of the straight guide members 2a and 3a is fixed to each of the moving beds 2 and 3 at the ends only, even though the pitching is produced during the movements of the moving beds, the guide members 2a and 3a can be deformed accordingly, as depicted in FIG. 6 by way of example, to maintain a normal engagement with the driving wheels 20 and 23. As a practical straight guide member, a round bar of about 3 mm in diameter and 200 mm in length is employed, so the foregoing deformation can be flexibly conducted, and the material of the type, which is inexpensive and can be used event though previously somewhat deformed, provides low costs for the entire device.

Figure 7:
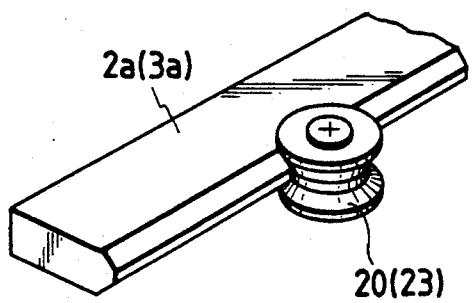
FIGS. 7 and 8 are views showing other examples of the straight guide member.
Figure 8:
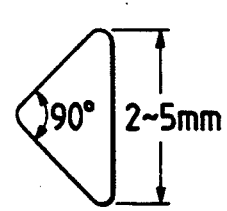

Although, in the above embodiment, the round bar, namely, the member of the circular cross section, is employed as each of the straight guide members 2a and 3a, the member of such a cross section as is shown in FIG. 7 or 8 may be used as a matter of course. In the case, each driving wheel is mounted to be somewhat loosely movable in its axial direction, thereby enabling the difficulty of the pitching to be obviated. Also, although the brake means is disposed in each driving knob, each intermediate transmission gear may well be provided with the brake means is such a manner that, as indicated by chain lines FIG. 2, for instance, the coned disc spring is interposed between the first lever 18 and the intermediate transmission gear 19.

What is claimed is:

1. A stage driving device, comprising:
   a pair of moving beds traveling in directions perpendicular to each other;
   straight guide members mounted one on one side of each of the moving beds;
   driving knobs extending in a direction perpendicular to planes along which the moving beds travel, coaxially arranged to facilitate the moving beds travel; and
   a transmission mechanism arranged between the driving knobs and the straight guide members, converting a rotary motion of each of the driving knobs into a rectilinear motion through each of the straight guide members of the moving beds,
   said transmission mechanism including rotary gears being integral with the driving knobs, levers being attached concentrically and rotatably to the driving knobs, said levers concentrically and integrally supporting intermediate transmission gears, said intermediate transmission gears meshing with the rotary gears and driving wheels, said driving wheels being engageable with and disengageable from the straight guide members upon rotation of said driving knobs.

2. The stage driving device according to claim 1, wherein said driving knobs include brake means such that a braking force acts on the moving beds when the driving wheel are engaged with the straight guide members.

3. The stage driving device according to claim 1, wherein said intermediate transmission gears include brake means such that a braking force acts on the moving beds when the driving wheels are engaged with the straight guide members.

4. The stage driving device according to claim 1, wherein each of said straight guide members has a substantially circular cross section and each of said straight guide members is attached to each of the moving beds at ends thereof.

5. The stage driving device according to claim 1, wherein each of said straight guide members has a substantially triangular cross section and each of said straight guide members is attached to each of the moving beds at ends thereof.

* * * * *